US008902059B2

(12) United States Patent
Mahmoud

(10) Patent No.: US 8,902,059 B2
(45) Date of Patent: Dec. 2, 2014

(54) TRACKING APPARATUS FOR BAGGAGE

(75) Inventor: Mohamed F. Mahmoud, Fremont, CA (US)

(73) Assignee: Umm Al-Qura University, Makkah (SA)

( * ) Notice: Subject to any disclaimer, the term of this patent is extended or adjusted under 35 U.S.C. 154(b) by 0 days.

(21) Appl. No.: 13/594,176

(22) Filed: Aug. 24, 2012

(65) Prior Publication Data
US 2013/0050019 A1 Feb. 28, 2013

Related U.S. Application Data

(60) Provisional application No. 61/529,844, filed on Aug. 31, 2011.

(51) Int. Cl.
G08B 1/08 (2006.01)
G01S 19/16 (2010.01)
G06Q 10/08 (2012.01)

(52) U.S. Cl.
CPC ............... *G01S 19/16* (2013.01); *G06Q 10/08* (2013.01)
USPC ............... 340/539.13; 340/539.1; 340/572.1; 340/568.1; 342/357.25; 342/357.54

(58) Field of Classification Search
CPC ........... G08B 21/0261; G08B 21/0266; G08B 21/0269; G01S 19/16
USPC ................. 340/539.13, 539.1, 539.11, 568.1, 340/568.5, 568.6, 572.1, 571; 342/357.25, 342/357.54
See application file for complete search history.

(56) References Cited

U.S. PATENT DOCUMENTS

| | | | | |
|---|---|---|---|---|
| 5,751,246 A * | 5/1998 | Hertel | ...................... | 342/357.31 |
| 6,624,752 B2 * | 9/2003 | Klitsgaard et al. | .......... | 340/572.1 |
| 6,847,892 B2 * | 1/2005 | Zhou et al. | ..................... | 701/408 |
| 6,975,222 B2 * | 12/2005 | Krishan et al. | ........... | 340/539.13 |
| 7,098,786 B2 * | 8/2006 | Dvorak et al. | ........... | 340/539.15 |
| 7,205,895 B2 * | 4/2007 | Outlaw et al. | .............. | 340/572.1 |
| 7,218,227 B2 * | 5/2007 | Davis et al. | ................ | 340/572.1 |
| 7,518,502 B2 * | 4/2009 | Austin et al. | ............... | 340/539.1 |
| 7,916,025 B2 * | 3/2011 | Locker et al. | .............. | 340/572.1 |
| 8,199,014 B1 * | 6/2012 | Kindeberg | ................. | 340/572.1 |
| 8,223,009 B2 * | 7/2012 | Anderson et al. | .......... | 340/539.1 |
| 8,258,942 B1 * | 9/2012 | Lanzone et al. | ......... | 340/539.13 |
| 8,321,124 B2 * | 11/2012 | Curatolo et al. | ............. | 701/300 |
| 2003/0050038 A1 * | 3/2003 | Haave et al. | .................. | 455/404 |
| 2009/0040101 A1 * | 2/2009 | Ani et al. | .................. | 342/357.07 |
| 2011/0098058 A1 * | 4/2011 | Mahalingam | .............. | 455/456.1 |
| 2011/0148625 A1 * | 6/2011 | Velusamy | ................ | 340/539.13 |
| 2011/0205021 A1 * | 8/2011 | Ferrari | ........................... | 340/8.1 |

* cited by examiner

*Primary Examiner* — Eric M Blount
(74) *Attorney, Agent, or Firm* — Oblon, Spivak, McClelland, Maier & Neustadt, L.L.P.

(57) ABSTRACT

Embodiments of the present invention provide an apparatus for tracking an item transported with the apparatus. The apparatus comprises a global positioning system (GPS) module for determining a location of the item based on GPS signals received from one or more GPS satellites. The apparatus further comprises a mobile communications controller for generating a message including the determined location of the item, wherein the mobile communications controller sends the generated message to at least one mobile device. The mobile communications controller may also send the generated message to a remote server maintaining location tracking information for one or more items.

20 Claims, 7 Drawing Sheets

TRACKING APPARATUS FOR BAGGAGE

CROSS REFERENCE TO RELATED APPLICATIONS

This application claims priority from U.S. Provisional Patent Application Ser. No. 61/529,844 filed Aug. 31, 2011, incorporated herein by reference in its entirety.

BACKGROUND

The present invention relates to a tracking apparatus, and in particular, a tracking apparatus for tracking an item transported with the tracking apparatus.

Lost or delayed baggage items (e.g., luggage) is a well-recognized problem in the airline industry. As the number of airline passengers has increased, so has the number of complaints pertaining to lost or delayed baggage. Most airlines employ an outdated system to move and track passengers' baggage. The present invention provides a tracking apparatus that allows a traveler to independently track his or her baggage. The present invention also provides a tracking apparatus that allows a mail courier to more effectively track mail items, such as packages and parcels.

BRIEF SUMMARY

Embodiments of the present invention provide an apparatus for tracking an item transported with the apparatus. The apparatus comprises a global positioning system (GPS) module for determining a location of the item based on GPS signals received from one or more GPS satellites. The apparatus further comprises a mobile communications controller for generating a message including the determined location of the item. The mobile communications controller sends the generated message to at least one mobile device. The mobile communications controller may also send the generated message to a remote server maintaining location tracking information for one or more items.

In another embodiment, the present invention provides a system for tracking an item. The system comprises a tracking apparatus that is transported with the item. The tracking apparatus comprises a global positioning system (GPS) module for determining a location of the item based on GPS signals received from one or more GPS satellites. The tracking apparatus further comprises a mobile communications controller for generating a message including the determined location of the item. The mobile communications controller sends the generated message to at least one mobile device. The mobile communications controller may also send the generated message to a remote server maintaining location tracking information for one or more items.

In yet another embodiment, the present invention provides a method for tracking an item. The method comprises receiving global positioning system (GPS) signals received from one or more GPS satellites, determining a location of the item based on GPS signals received, and generating a message including the determined location of the item. The generated message is sent to at least one mobile device. The generated message may also be sent to a remote server maintaining location tracking information for one or more items.

These and other features, aspects and advantages of the present invention will become understood with reference to the following description, appended claims and accompanying figures.

DETAILED DESCRIPTION

Figure 1:
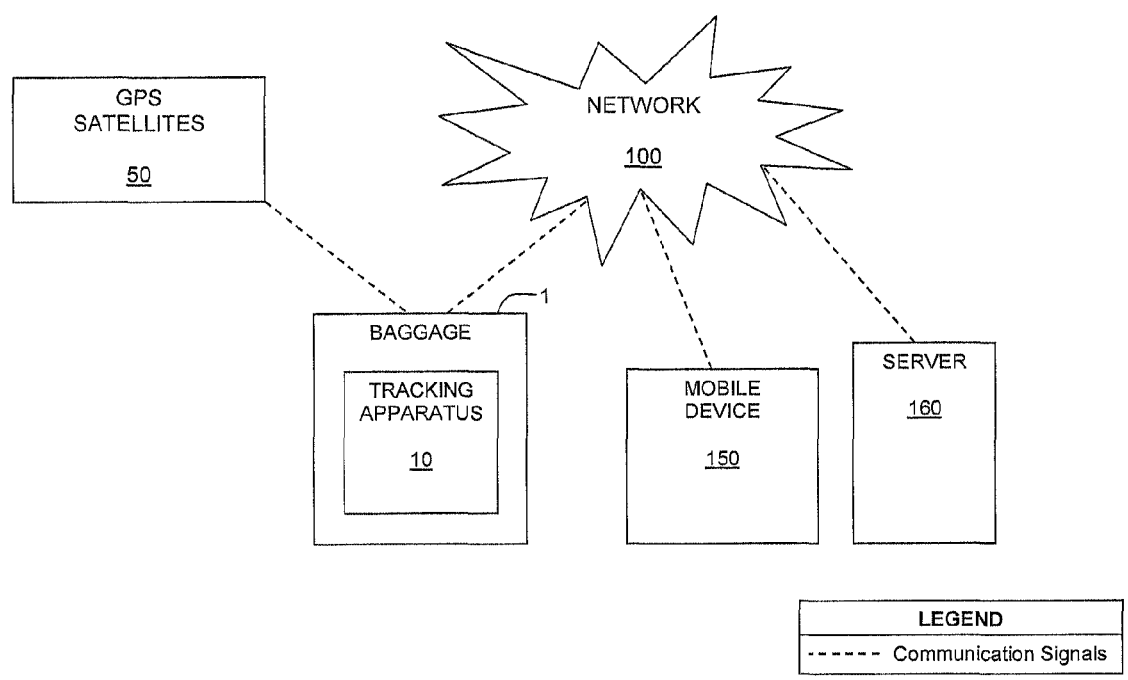
FIG. 1 illustrates a high level block diagram of a baggage locator apparatus, in accordance with an embodiment of the invention.

Embodiments of the present invention provide an apparatus for tracking an item transported with the apparatus. The apparatus comprises a global positioning system (GPS) module for determining a location of the item based on GPS signals received from one or more GPS satellites. The apparatus further comprises a mobile communications controller for generating a message including the determined location of the item. The mobile communications controller sends the generated message to at least one mobile device. The mobile communications controller may also send the generated message to a remote server maintaining location tracking information for one or more items.

In another embodiment, the present invention provides a system for tracking an item. The system comprises a tracking apparatus that is transported with the item. The tracking apparatus comprises a global positioning system (GPS) module for determining a location of the item based on GPS signals received from one or more GPS satellites. The tracking apparatus further comprises a mobile communications controller for generating a message including the determined location of the item. The mobile communications controller sends the generated message to at least one mobile device. The mobile communications controller may also send the generated message to a remote server maintaining location tracking information for one or more items.

In yet another embodiment, the present invention provides a method for tracking an item. The method comprises receiving global positioning system (GPS) signals received from one or more GPS satellites, determining a location of the item based on GPS signals received, and generating a message including the determined location of the item. The generated message is sent to at least one mobile device. The generated message may also be sent to a remote server maintaining location tracking information for one or more items.

The mobile communications controller sends the generated message to a remote server maintaining location tracking information for one or more items. The apparatus further comprises a clock for generating time stamps. The generated message further includes an identifier corresponding to the item and a time stamp corresponding to the determined location of the item.

The apparatus further comprises a battery unit for supplying power to operate the apparatus, an electronic switch that is movable between an on position and an off position, and a power timer controller including a memory unit for maintaining a preset time interval. The power timer controller turns the electronic switch to the on position at the preset time interval maintained.

The battery unit supplies power to the GPS module and the mobile communications controller only when the electronic switch is turned to the on position. The mobile communications controller includes a memory unit for maintaining contact information for at least one mobile device. The GPS module includes a memory unit for maintaining all determined locations of the item.

The memory unit of the GPS module further includes a lookup table maintaining location coordinates of different cities worldwide. The GPS module determines location coordinates of the item based on the GPS signals received, and determines a city having location coordinates nearest to the location coordinates of the item based on the lookup table. The generated message further includes the determined city having location coordinates nearest to the location coordinates of the item.

The mobile communications controller further includes an audio visual interface for receiving one or more of the following user inputs: contact information for said at least one mobile device, a preset time interval, and a clock setting that sets the clock to a local time of a location.

In one embodiment, the generated message is an e-mail message, and the contact information for a mobile device includes an e-mail addresses corresponding to the mobile device. In another embodiment, the generated message is a short message service and the contact information for a mobile device includes a mobile number corresponding to the mobile device.

The mobile communications controller sends an acknowledgement packet to the power timer controller when the generated message is successfully sent to, and received by, said at least one mobile device. Upon receiving the acknowledgement packet, the power timer controller turns the electronic switch to the off position. The battery unit is disconnected from the GPS module and the mobile communications controller when the electronic switch is turned to the off position.

FIG. 1 illustrates a high level block diagram of a tracking apparatus 10, in accordance with an embodiment of the invention. The tracking apparatus 10 tracks the location of a baggage item ("baggage") 1 that is transported with the tracking apparatus 10. The tracking apparatus 10 may be removably attached to, or disposed within, the baggage 1. For example, the tracking apparatus 10 may be disposed inside a locked compartment of the baggage 1.

The tracking apparatus 10 determines the location tracking information of the baggage 1 based on communication signals (COM) received from one or more GPS satellites 50. Specifically, the tracking apparatus 10 determines the location tracking information of the baggage 1 based on GPS signals received from one or more GPS satellites 50. A GPS satellite 50 continually transmits GPS signals. A GPS signal transmitted by a GPS satellite 50 includes orbital information of the GPS satellite 50.

As later described in detail herein, the tracking apparatus 10 processes the GPS signals received to determine the current location of the baggage 1. The tracking apparatus 10 then generates a message including the current location of the baggage 1 and a time stamp indicating when the current location was determined (i.e., when the baggage 1 was at the current location). The tracking apparatus 10 wirelessly sends (e.g., using radio frequency communication) communication signals including the generated message to one or more mobile devices 150 (e.g., the mobile device of the owner of the baggage 1) via a network 100. The network 100 may be the Internet, a mobile cellular network, or another type of network.

The tracking apparatus 10 also wirelessly sends communication signals including the generated message to a remote server 160 that maintains location tracking information for multiple items. Location tracking information for an item is retrieved from the server 160 using an identifier (e.g., identification number) corresponding to said item. For example, the server 160 may be a database server operated by a service provider, such as an airline or a mail courier. The owner of the baggage 1 may access the server 160 (e.g., via a website set up by an airline), and retrieve location tracking information for the baggage 1 using an identifier assigned to the baggage 1. The location tracking information retrieved includes the most recent location of the baggage 1 and a corresponding time stamp indicating when the baggage 1 was at the most recent location.

The tracking apparatus 10 provides a traveler with the ability to independently track the location of his or her baggage. As such, the tracking apparatus 10 revolutionizes the airline industry by reducing the amount of resources that airlines employ to respond to inquiries from travelers with lost or delayed baggage.

In another embodiment, the present invention provides a tracking apparatus that allows a mail courier to more effectively track mail items, such as packages and parcels. Most mail couriers employ an outdated system involving the scanning of bar codes attached to mail items to identify and track the mail items couriered. Bar codes are typically scanned manually at pick-up locations and distribution centers along delivery routes. As such, the location tracking information for a mail item may not include the most recent location of the mail item.

The tracking apparatus 10 may be used in lieu of, or in addition to, the bar code system employed by the mail courier industry. For example, the tracking apparatus 10 may be transported with a mail item. The server 160 may be a database server operated by a mail courier that couriers the mail item. The sender or recipient of the mail item may access the server 160 (e.g., via a website set up by the mail courier), and retrieve location tracking information for the mail item using an identifier (e.g., tracking number) assigned to the mail item. The location tracking information retrieved includes the most recent location of the baggage 1 and a corresponding time stamp indicating when the baggage 1 was at the most recent location.

Figure 2:
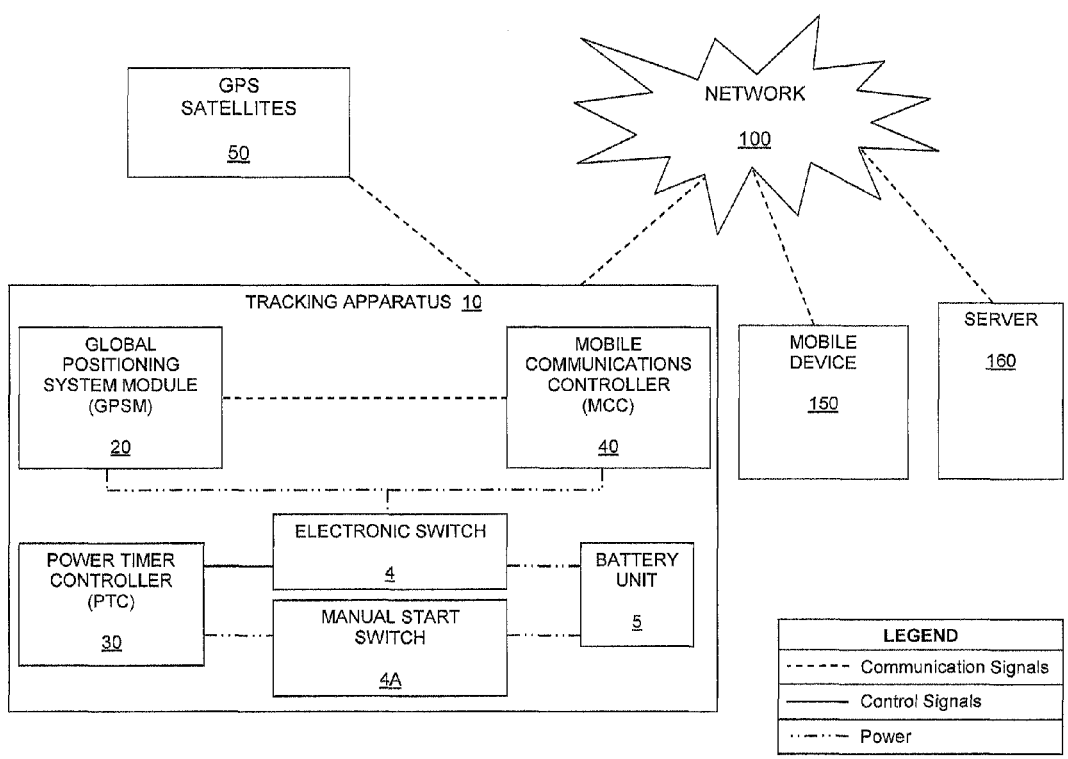
FIG. 2 illustrates a block diagram of components of a baggage locator apparatus, in accordance with an embodiment of the invention.

FIG. 2 illustrates a block diagram of components of a tracking apparatus 10, in accordance with an embodiment of the invention. The tracking apparatus 10 comprises a global positioning system module (GPSM) 20, a mobile communications controller (MCC) 40, a power timer controller (PTC) 30, an electronic switch 4, a battery unit 5, and a manual start switch 4A.

The battery unit 5 supplies power to operate the tracking apparatus 10. The manual start switch 4A is manually movable between an open position and a closed position. When the manual start switch 4A is manually moved to the closed position, the battery unit 5 is connected to the PTC 30. The PTC 30 receives power (P) from the battery unit 5 when the PTC 30 is connected to the battery unit 5. The manual start switch 4A may be manually moved to the closed position when the baggage 1 is ready to be transported/shipped.

The battery unit 5 remains connected to the PTC 30 until the manual start switch 4A is manually moved to the open position. The manual start switch 4A may be manually moved to the open position when the owner of the baggage 1 receives the baggage 1.

The electronic switch 4 is movable between an on position and an off position. As later described in detail herein, the PTC 30 sends control signals (CON) to the electronic switch 4 to turn on or turn off the electronic switch 4. Specifically, the PTC 30 is configured to turn the electronic switch 4 to the on position at a preset time interval (e.g., every 2 hours). When the PTC 30 turns the electronic switch 4 to the on position, the battery unit 5 is connected to the GPSM 20 and the MCC 40. The GPSM 20 receives power from the battery unit 5 when the GPSM 20 is connected to the battery unit 5. The MCC 40 receives power from the battery unit 5 when the MCC 40 is connected to the battery unit 5.

As later described in detail herein, when the GPSM 20 and the MCC 40 are powered on, the GPSM 20 polls for GPS signals and begins receiving GPS signals from one or more GPS satellites 50. The GPSM 20 determines the location (i.e., position) of the baggage 1 (FIG. 1) based on the GPS signals received. Upon determining the location of the baggage 1, the GPSM 20 sends communication signals including the determined location of the baggage 1 to the MCC 40.

As later described in detail herein, the MCC 40 generates a message including the following location tracking information: (1) the location of the baggage 1, including the name of the city nearest to location of the baggage 1, (2) a time stamp corresponding to the location of the baggage 1, and (3) an identifier (e.g., an identification number) corresponding to the baggage 1. In another embodiment, the identifier corresponds to the tracking apparatus 10.

The MCC 40 wirelessly sends (e.g., using radio frequency communication) the generated message to one or more mobile devices 150 via a network 100. As stated above, the network 100 may be the Internet, a mobile cellular network, or another type of networks. The MCC 40 may also wirelessly send the generated message to a remote server 160 that maintains location tracking information for multiple items.

Upon successful transmission of the generated message, the MCC 40 generates and sends an acknowledgment (ACK) packet to the PTC 30. Upon receiving the ACK packet, the PTC 30 turns the electronic switch 4 to the off position, thereby disconnecting the battery unit 5 from the GPSM 20 and the MCC 40. Disconnecting the battery unit 5 from the GPSM 20 and the MCC 40 powers off the GPSM 20 and the MCC 40. Disconnecting the battery unit 5 conserves the energy of the battery unit 5 and extends the battery life of the battery unit 5, thereby enabling the tracking apparatus 10 to track the baggage 1 for longer periods of time.

Figure 3:
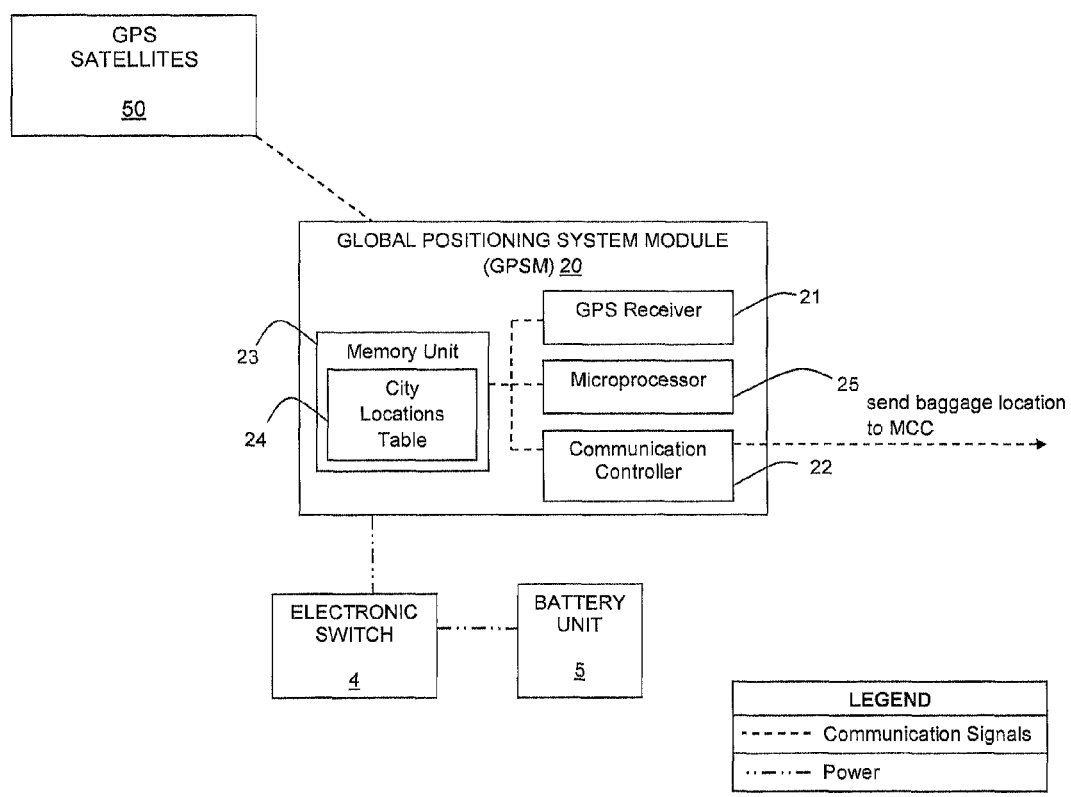
FIG. 3 illustrates a global positioning system module of a baggage locator apparatus, in accordance with an embodiment of the invention.

FIG. 3 illustrates a GPSM module 20 of a tracking apparatus 10, in accordance with an embodiment of the invention. The GPSM 20 comprises a GPS receiver 21, a microprocessor 25, a communications controller 22, and a memory unit 23.

The GPS receiver 21 of the GPSM 20 is configured to receive communication signals including GPS signals from one or more GPS satellites 50. As discussed earlier, a GPS signal transmitted by a GPS satellite 50 includes orbital information of the GPS satellite 50.

The microprocessor 25 of the GPSM 20 is configured to process the information included in a GPS signal received. Specifically, the microprocessor 25 is configured to determine the transit time of the GPS signal and the distance between the baggage 1 (FIG. 1) and the GPS satellite 50 that transmitted the received GPS signal. Using the orbital information provided in the received GPS signal as well as the computed distance between the baggage 1 and the GPS satellite 50, the microprocessor 25 determines the location coordinates (i.e., longitude and latitude coordinates) of the baggage 1.

The memory unit 23 of the GPSM 20 is configured to store historical location tracking information. The memory unit 23 maintains all previously determined location coordinates, and corresponding time stamps, of the baggage 1. The memory unit 23 further includes a static lookup table (City Locations Table) 24 that stores location coordinates for different cities in the world. The microprocessor 25 accesses the memory unit 23 to determine a city with location coordinates closest to the location coordinates of the baggage 1 (FIG. 1). Upon determining the city nearest to the location coordinates of the baggage 1, the microprocessor 25 sends information relating to the location of the baggage 1 to the MCC 40 via the communications controller 22 of the GPSM 20. The communications controller 22 sends to the MCC 40 communication signals, including the name of the city nearest to the location coordinates of the baggage 1.

Figure 4:
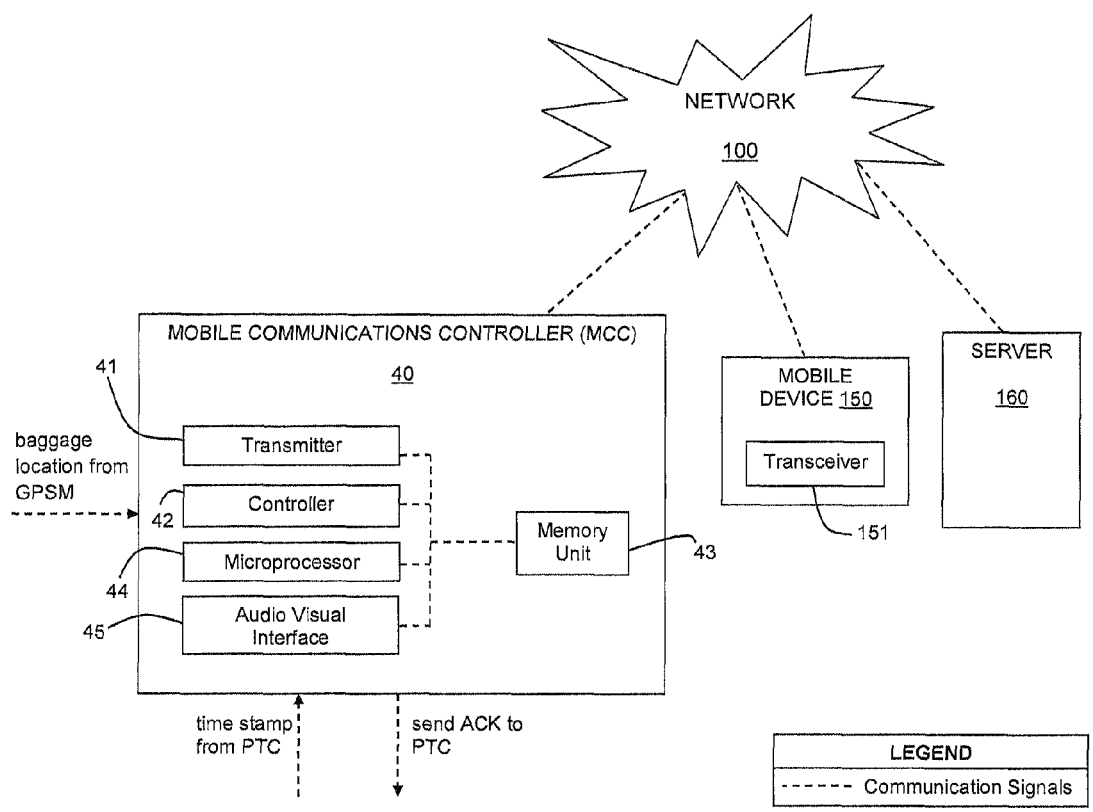
FIG. 4 illustrates a block diagram of a mobile communications controller module of a baggage locator apparatus, in accordance with an embodiment of the invention.

FIG. 4 illustrates a block diagram of a mobile communications controller 40 of a tracking apparatus 10, in accordance with an embodiment of the invention. The MCC 40 comprises a transceiver 41, a controller 42, a memory unit 43, a microprocessor 44, and an audio visual (A/V) interface 45.

The controller 42 of the MCC 40 is configured to receive information relating to the location of the baggage 1 (FIG. 1) from the GPSM 20. The controller 42 is further configured to generate a message based on the information received. The generated message may be an e-mail message, a short message service (SMS), or another type of message. The generated message includes the following location tracking information: (1) the location of the baggage 1, including the name of the city nearest to the location of the baggage 1, (2) a time stamp corresponding to the location of the baggage 1, and (3) an identifier (e.g., an identification number) corresponding to the baggage 1. In another embodiment, the identifier corresponds to the tracking apparatus 10. An internal clock 34 (FIG. 5) of the PTC 30 provides time stamps to the MCC 40.

The transceiver 41 of the MCC 40 is configured to wirelessly send communication signals including the generated message to one or more mobile devices 150 (e.g., the mobile device of the owner of the baggage 1) via the network 100. The transceiver 41 is also configured to wirelessly send communication signals including the generated message to a remote server 160 that maintains location tracking information for multiple items.

A transceiver 151 of each mobile device 150 wirelessly receives (e.g., using radio frequency communication) communication signals including the message generated by the tracking apparatus 10 from the network 100. The message received by the transceiver 151 includes the location of the baggage 1, the time stamp corresponding to the location of the baggage 1, and the identifier corresponding to the baggage 1. Similarly, the remote server 160 receives communication signals including the message generated by the tracking apparatus 10 from the network 100.

Contact information (e.g., e-mail address, mobile number) for each mobile device 150 that the generated message is sent to is pre-stored in the memory unit 43 of the MCC 40.

The A/V interface 45 of the MCC 40 may comprise a graphic display, and alphanumeric and directional keypads. The owner of the baggage 1 (FIG. 1) may utilize the A/V interface 45 to program any one of the following (1) contact information (e.g., e-mail address, mobile number) for one or more mobile devices 150, (2) a preset time interval to a memory unit 31 (FIG. 5) of the PTC 30, and (3) a clock setting. The clock 34 may be set to a local time of a location (e.g., a departure point/city, an arrival point/city), such that time stamps generated by the clock 34 are based on the local time that the clock 34 is set to.

The A/V interface 45 can also be configured to display information such as: (1) historical location tracking information, including all previously determined locations, and corresponding time stamps, of the baggage 1, (2) all pre-stored contact information for one or more mobile devices 150, (3) the preset time interval, and (4) the time of the clock 34. The A/V interface may comprise other types of electronic or manual data input means.

Each mobile device 150 must be connected to the network 100 to receive the generated message. If the generated message was successfully transmitted, the controller 42 of the MCC 40 generates control signals including an acknowledgement (ACK) packet that are sent to the PTC 30. If the transceiver 41 receives a protocol message from the network 100 indicating that the delivery of the generated message was unsuccessful (e.g., a NACK packet), the transceiver 41 re-sends the generated message. Also, if the transceiver 41 does not receive the ACK packet after 7 seconds, the transceiver 41 re-sends the generated message.

Figure 5:
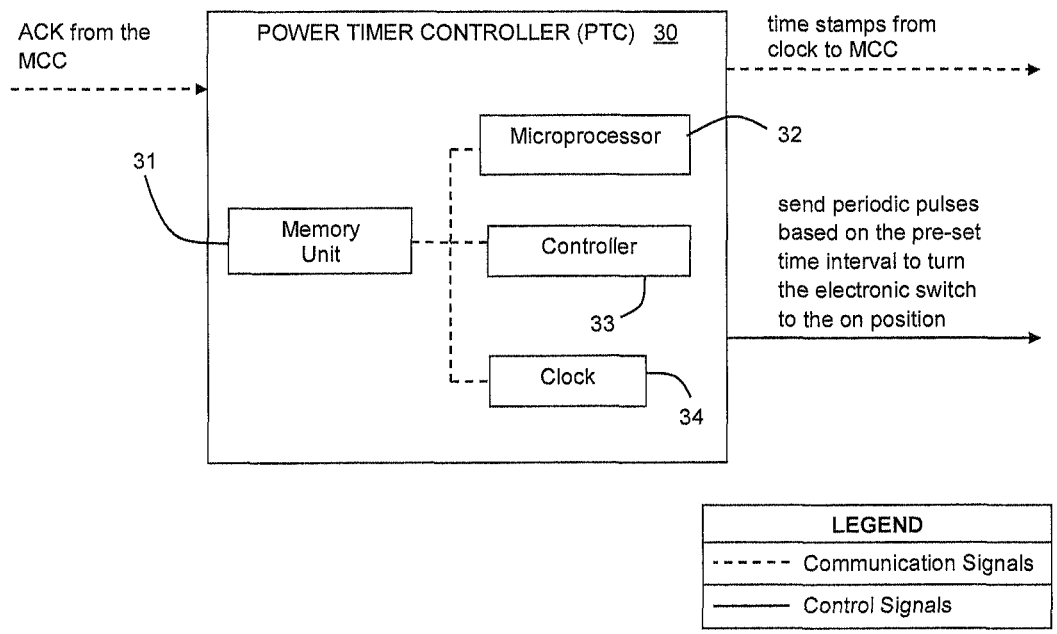
FIG. 5 illustrates a block diagram of a power timer controller of a baggage locator apparatus, in accordance with an embodiment of the invention.

FIG. 5 illustrates a block diagram of a power timer controller 30 of a tracking apparatus 10, in accordance with an embodiment of the invention. The PTC 30 comprises a memory unit 31, a microprocessor 32, a controller 33, and the internal clock 34. The PTC 30 is configured to turn the electronic switch 4 (FIG. 2) to the on position or the off position.

The internal clock 34 provides communication signals including time stamps to the MCC 40. The operation of the internal clock 34 is maintained as long as the PTC 30 is connected to the battery unit 5. As stated above, the battery unit 5 is connected to the PTC 30 when the manual start switch 4A is moved to the closed position.

The memory unit 31 maintains a preset time interval that was inputted by the owner of the baggage 1 before the tracking apparatus 10 is transported with the baggage 1. The preset time interval maintained indicates how often the PTC 30 should turn the electronic switch 4 to the on position to power on the GPSM 20 and the MCC 40.

Based on the preset time interval maintained and the elapsed time as provided by the internal clock 34, the microprocessor 32 triggers the controller 33 to send control signals to turn the electronic switch 4 to the on position. Specifically, the controller 33 generates and transmits periodic electrical pulses at a frequency that is in accordance with the preset time interval (e.g., every 2 hours). The pulses transmitted turn the electronic switch 4 to the on position.

As described earlier, when the electronic switch 4 is turned to the on position, the battery unit 5 is connected to the GPSM module 20 and the MCC module 40. Connecting the battery unit 5 to the GPSM module 20 and the MCC module 40 powers on the GPSM module 20 and the MCC module 40. When the GPSM module 20 and the MCC module 40 are powered on, the tracking apparatus 10 (FIG. 2) tracks the location of the baggage 1 (FIG. 1).

When the PTC 30 receives control signals including an ACK packet from the MCC 40, the controller 33 of the PTC 30 sends control signals to turn the electronic switch 4 to the off position. As such, the PTC 30 turns the electronic switch 4 to the on position for a short period of time only (e.g., 15 seconds).

Turning the electronic switch 4 to the off position disconnects the battery unit 5 from the GPSM module 20 and the MCC module 40. Disconnecting the battery unit 5 from the GPSM module 20 and the MCC module 40 powers off the GPSM module 20 and the MCC module 40. When the GPSM module 20 and the MCC module 40 are powered off, the tracking apparatus 10 (FIG. 2) does not track the location of the baggage 1 (FIG. 1), thereby conserving power.

Figure 6:
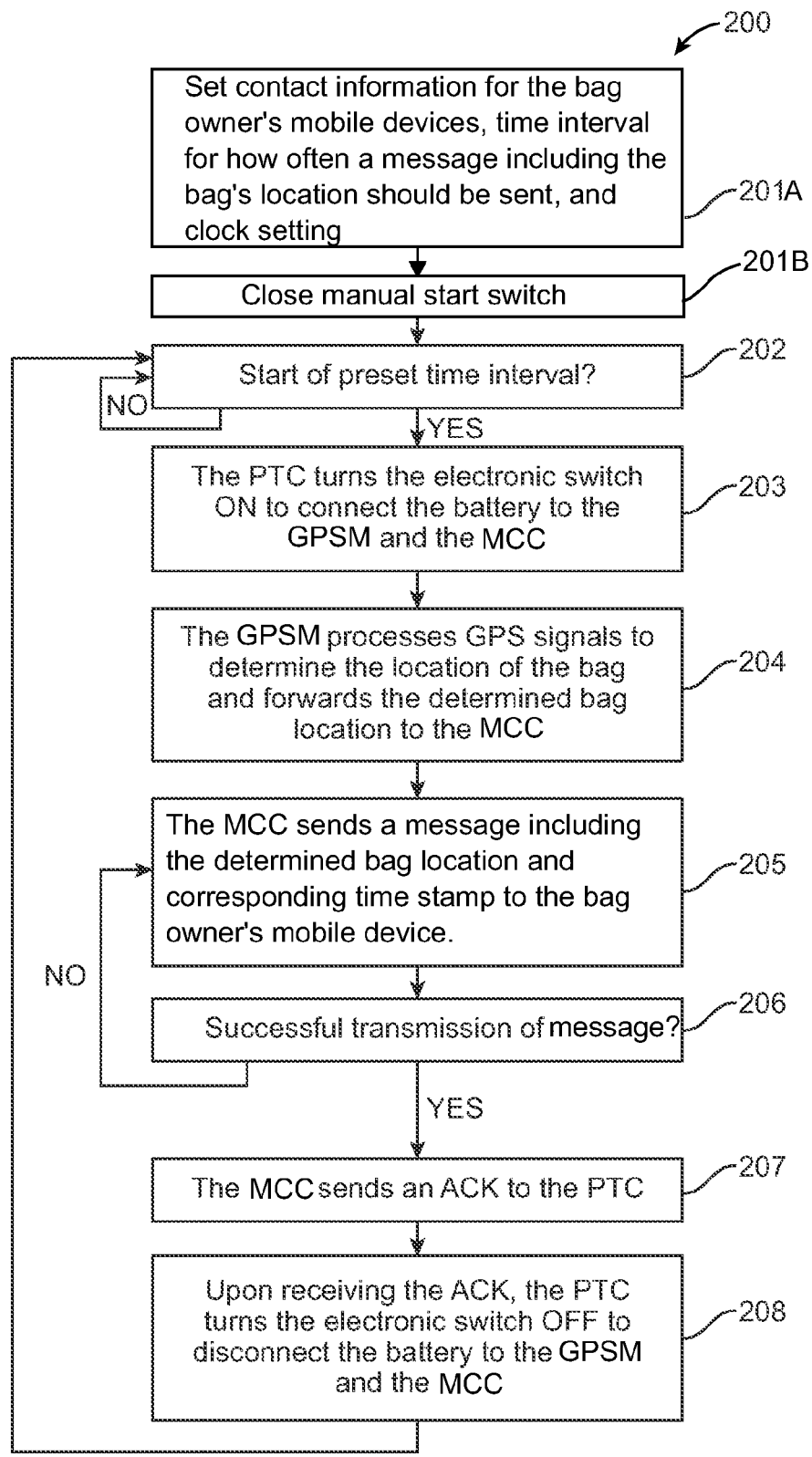
FIG. 6 illustrates a flowchart of an example process for a baggage locator apparatus, in accordance with an embodiment of the invention.

FIG. 6 illustrates a flowchart of an example process 200 for tracking baggage, in accordance with an embodiment of the invention. In process block 201A, a time interval is preset, contact information for one or more mobile devices of the baggage owner is pre-stored, and a clock setting is set. In process block 201B, the manual start switch is moved to the closed position. In process block 202, the occurrence of a start of a preset time interval is determined. A preset time interval starts when the manual start switch is manually closed. If a start of a preset time interval has not occurred, loop back to process block 202. If a start of a preset time interval has occurred, the PTC turns on the electronic switch to connect the battery to the GPSM and the MCC as in process block 203. In process block 204, the GPSM processes GPS signals to determine the location of the baggage, and forwards the determined location of the baggage, to the MCC. In process block 205, the MCC generates and sends a message with the determined location of the baggage and a corresponding time stamp to the bag owner's mobile devices. In process block 206, the MCC determines if the message was successfully transmitted. If the message was successfully transmitted, the MCC sends an ACK packet to the PTC as in process block 207. If the message was not successfully transmitted (e.g., the transceiver of the MCC received a NACK packet or did not receive any signal within 7 seconds), loop back to process block 205. In process block 208, upon receiving the ACK packet, the PTC turns off the electronic switch to disconnect the battery from the GPSM and the MCC. The process 200 loop back to process block 202 every time interval to repeat the process.

Figure 7:
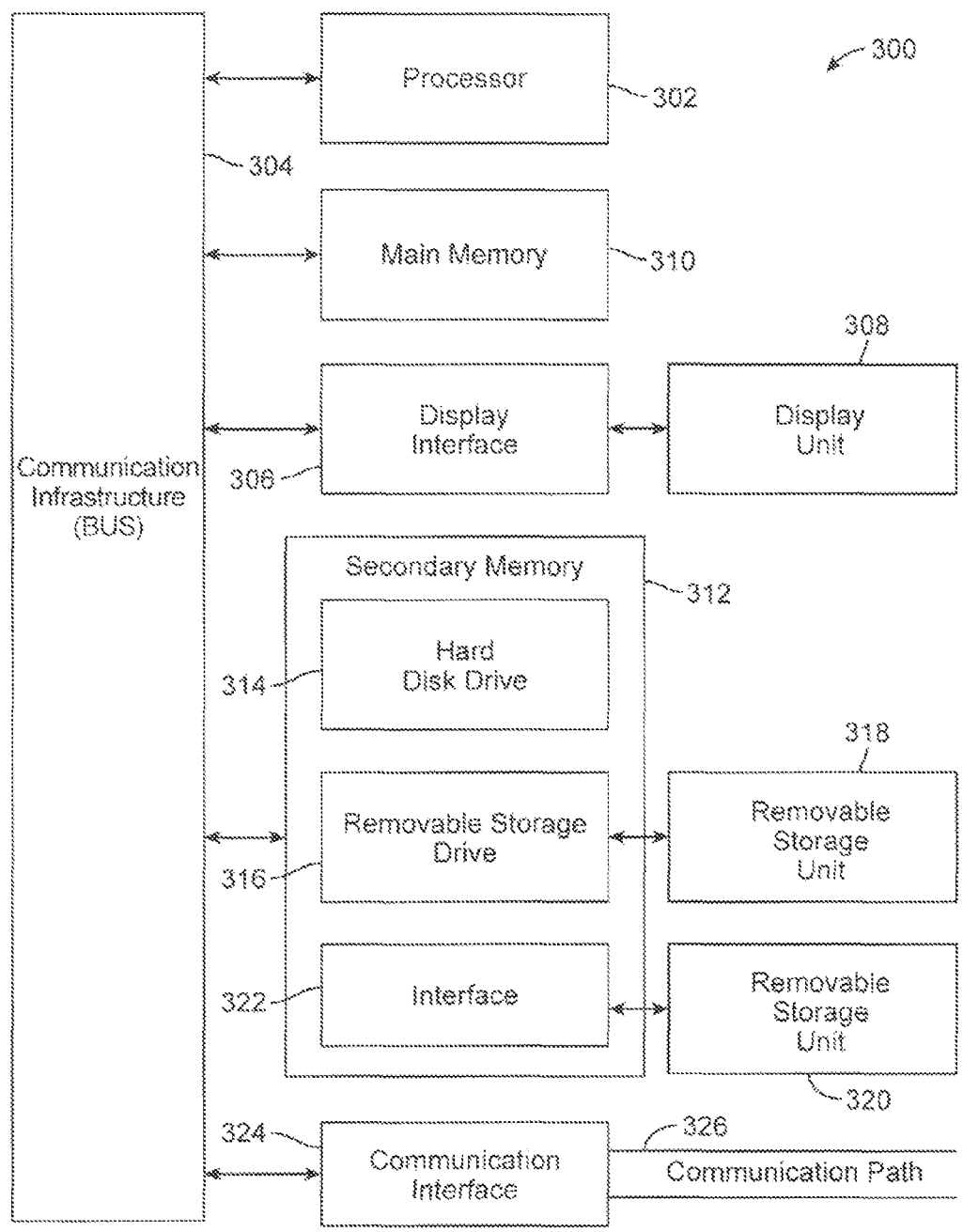
FIG. 7 is a high level block diagram showing an information processing circuit useful for implementing one embodiment of the present invention.

FIG. 7 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for tracking an item transported with the apparatus, the apparatus comprising:
a global positioning system (GPS) module configured to determine a location of the item based on GPS signals received from one or more GPS satellites;
a power timer controller; and
a mobile communications controller having processing circuitry configured to
generate a message including the determined location of the item, wherein the mobile communications controller transmits the generated message to at least one mobile device based on timing information programmed into the mobile communications controller, and
generate and send, in response to successful transmission of the generated message, an acknowledgement packet to the power timer controller,
wherein the power timer controller, in response to receiving the acknowledgement packet, disconnects power from the GPS module and the mobile communications controller.

2. The apparatus of claim 1, wherein:
the timing information comprises a preset time interval;
based on the preset time interval, the mobile communications controller periodically generates and transmits updated location information for the item to at least one mobile device, wherein the updated location information comprises a location of the item determined by the GPS module; and
the mobile communications controller further transmits the updated location information to a remote server maintaining location tracking information for one or more items.

3. The apparatus of claim 2, further comprising:
a clock for generating time stamps;
wherein the updated location information further includes an identifier corresponding to the item and a time stamp corresponding to the determined location of the item.

4. The apparatus of claim 3, further comprising:
a battery unit for supplying power to operate the apparatus;
an electronic switch, wherein the electronic switch is movable between an on position and an off position,
wherein the power timer controller includes a memory unit for maintaining the preset time interval, and turns the electronic switch to the on position at the preset time interval.

5. The apparatus of claim 4, wherein:
the battery unit supplies power to the GPS module and the mobile communications controller only when the electronic switch is turned to the on position.

6. The apparatus of claim 5, wherein the mobile communications controller includes a memory unit for maintaining contact information for the at least one mobile device.

7. The apparatus of claim 6, wherein the GPS module includes a memory unit for maintaining all determined locations of the item.

8. The apparatus of claim 7, wherein the memory unit of the GPS module further includes a lookup table maintaining location coordinates of different cities worldwide.

9. The apparatus of claim 8, wherein the GPS module:
determines location coordinates of the item based on the GPS signals received; and
determines a city having location coordinates nearest to the location coordinates of the item based on the lookup table;
wherein the updated location information further includes the determined city having location coordinates nearest to the location coordinates of the item.

10. The apparatus of claim 9, wherein the mobile communications controller further includes an audio visual interface for receiving one or more of the following user inputs: contact information for the at least one mobile device, the preset time interval, and a clock setting that sets the clock to a local time of a location.

11. The apparatus of claim 10, wherein:
each message generated by the mobile communications controller comprises an e-mail message; and
the contact information for the at least one mobile device includes one or more e-mail addresses corresponding to the at least one mobile device.

12. The apparatus of claim 10, wherein:
each message generated by the mobile communications controller comprises a short message service; and
the contact information for the at least one mobile device includes one or more mobile numbers corresponding to the at least one mobile device.

13. The apparatus of claim 10, wherein:
upon receiving the acknowledgement packet, the power timer controller turns the electronic switch to the off position; and
wherein the battery unit is disconnected from the GPS module and the mobile communications controller when the electronic switch is turned to the off position.

14. A system for tracking an item, the system comprising:
a tracking apparatus that is transported with the item, wherein the tracking apparatus comprises:
a global positioning system (GPS) module configured to determine a location of the item based on GPS signals received from one or more GPS satellites;
a power time controller; and
a mobile communications controller having processing circuitry configured to
generate a message including the determined location of the item, wherein the mobile communications controller transmits the generated message to at least one mobile device based on timing information programmed into the mobile communications controller, and
generate and send, in response to successful transmission of the generated message, an acknowledgement packet to the power timer controller,
wherein the power timer controller, in response to receiving the acknowledgement packet, disconnects power from the GPS module and the mobile communications controller.

15. The system of claim 14, wherein:
the timing information comprises a preset time interval;
based on the preset time interval, the mobile communications controller periodically generates and transmits updated location information for the item to at least one mobile device, wherein the updated location information comprises a location of the item determined by the GPS module; and
the mobile communications controller further transmits the updated location information to a remote server maintaining location tracking information for one or more items.

16. The system of claim 15, further comprising:
a clock for generating time stamps, wherein the updated location information further includes a time stamp corresponding to the determined location of the item;
a battery unit for supplying power to operate the tracking apparatus;
an electronic switch, wherein the electronic switch is movable between an on position and an off position
wherein the power timer controller includes a memory unit for maintaining the preset time interval, and turns the electronic switch to the on position at the preset time interval;
wherein the battery unit supplies power to the GPS module and the mobile communications controller only when the electronic switch is turned to the on position.

17. The system of claim 16, wherein:
upon receiving the acknowledgement packet, the power timer controller turns the electronic switch to the off position; and
wherein the battery unit is disconnected from the GPS module and the mobile communications controller when the electronic switch is turned to the off position.

18. A method for tracking an item, the method comprising:
receiving global positioning system (GPS) signals received from one or more GPS satellites;
determining, via a GPS module, a location of the item based on GPS signals received;
generating, via a mobile communications controller, a message including the determined location of the item;
transmitting the generated message to at least one mobile device based on programmed timing information; and
generating and sending, in response to successful transmission of the generated message, an acknowledgement packet to a power timer controller,
disconnecting, via the power time controller and in response to receiving the acknowledgement packet, power from the GPS module and the mobile communications controller.

19. The method of claim 18, further comprising:
based on a preset time interval included in the programmed timing information, periodically generating and transmitting updated location information for the item to at least one mobile device, wherein the updated location information comprises a location of the item determined by the GPS module; and
transmitting the updated location information to a remote server that maintains location tracking information for one or more items;
wherein the updated location information further includes an identifier corresponding to the item and a time stamp corresponding to the determined location of the item.

20. The method of claim 19, further comprising:
determining location coordinates of the item based on the GPS signals received; and
determines a city having location coordinates nearest to the location coordinates of the item;

wherein the updated location information further includes the determined city having location coordinates nearest to the location coordinates of the item.

\* \* \* \* \*